(12) United States Patent
Morvan et al.

(10) Patent No.: US 10,284,750 B2
(45) Date of Patent: May 7, 2019

(54) LIGHTNESS MAPPING IN TWO STEPS

(71) Applicant: THOMSON LICENSING, Issy les Moulineaux (FR)

(72) Inventors: Patrick Morvan, Laille (FR); Jurgen Stauder, Montreuil/Ille (FR); Corinne Poree, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 170 days.

(21) Appl. No.: 15/406,714

(22) Filed: Jan. 14, 2017

(65) Prior Publication Data
US 2017/0208218 A1 Jul. 20, 2017

(30) Foreign Application Priority Data
Jan. 15, 2016 (EP) ..................................... 16305033

(51) Int. Cl.
*H04N 1/60* (2006.01)
(52) U.S. Cl.
CPC .......... *H04N 1/6097* (2013.01); *H04N 1/6058* (2013.01)
(58) Field of Classification Search
CPC ............................ H04N 1/6058; H04N 1/6097
See application file for complete search history.

(56) References Cited

U.S. PATENT DOCUMENTS

| | | | | |
|---|---|---|---|---|
| 5,384,901 A | * | 1/1995 | Glassner | G06T 11/001 345/591 |
| 8,045,222 B2 | * | 10/2011 | Shirasawa | H04N 1/6058 358/1.9 |
| 8,373,898 B2 | * | 2/2013 | Bonnier | H04N 1/6058 345/590 |
| 2005/0248784 A1 | | 11/2005 | Henley et al. | |
| 2005/0253866 A1 | * | 11/2005 | Kim | G09G 5/02 345/594 |
| 2007/0236761 A1 | | 10/2007 | Sloan | |
| 2008/0068626 A1 | * | 3/2008 | Bala | H04N 1/6058 358/1.9 |

FOREIGN PATENT DOCUMENTS

| EP | 2375719 | | 10/2011 | |
|---|---|---|---|---|
| JP | 2005348053 A | * | 12/2005 | ........... H04N 1/6058 |

OTHER PUBLICATIONS

Zolliker et al. ("Continuity of gamut mapping algorithms," Journal of Electronic Imaging 15(1), Jan.-Mar. 2006) (Year: 2006).*
(Continued)

*Primary Examiner* — Yubin Hung
(74) *Attorney, Agent, or Firm* — Brian J. Dorini; Patricia A. Verlangieri

(57) ABSTRACT

Said method comprises a first cusp-oriented lightness-mapping step and a second lightness-mapping step in which a source color (N) is mapped into a mapped color (N") having the same hue (H"=H) and the same chroma (C"=C) as the source color, where the second mapping step is defined such as to bring more colors in a target color gamut and more colors closer to the boundary of this target gamut.

11 Claims, 5 Drawing Sheets

(56) References Cited

OTHER PUBLICATIONS

Kang et al. ("Perceptual gamut mapping on the basis of image quality and preference factors," Proceedings of the SPIE, vol. 6058, Jan. 16, 2006) (Year: 2006).*
Finlayson et al. ("Improving gamut mapping color constancy," IEEE Transactions on Image Processing, vol. 9, No. 10, Oct. 2000) (Year: 2000).*
Stauder et al., "Gamut Mapping for Motion Picture", 5th European Conference on Colour in Graphics, Imaging and Vision and 12th International Symposium on Muitispectral Colour Science, Joensuu, Finland, Jun. 14, 2010, pp. 380-386.
Stauder et al., "Motion Picture Versioning by Gamut Mapping",18th Color and Imaging Conference: Color Science and Engineering Systems, Technologies, and Applications, San Antonio, Texas, USA, Nov. 8, 2010, pp. 1-6.
Morovic et al., "The Fundamentals of Gamut Mapping: A Survey", Journal of Imaging Science and Technology, vol. 45, No. 3, May/Jun. 2001, pp. 283-290.
Montag et al., "Psychophysical Evaluation of Gamut Mapping Techniques Using Simple Rendered Images and Artificial Gamut Boundaries", IEEE Transactions on Image Processing, vol. 6, No. 7, Jul. 1997, pp. 977-989.
Zolliker et al., "On the Continuity of Gamut Mapping Algorithms", Journal of Electronic Imaging, vol. 15, No. 1, Jan. 2006, pp. 1-14.
Montag et al., "Gamut Mapping: Evaluation of Chroma Clipping Techniques for Three Destination Gamuts", 6th IS&T/SID Color Imaging Conference, Color Science, Systems, and Applications, Scottsdale, Arizona, USA, Nov. 17, 1998, pp. 57-61.
Morovic et al., "A Universal Algorithm for Colour Gamut Mapping", http://colour.derby.ac.uk/jan/morCIM98.pdf, Mar. 27, 1998, pp. 1-9.
Cholewo et al., "Gamut boundary determination using alpha-shapes", 7th IS&T/SID Color Imaging Conference, Color Science, Systems, and Applications, Scottsdale, Arizona, USA, Nov. 16, 1999, pp. 1-5.
Rolleston, "Visualization of Colorirnetric Calibration", Color Hard Copy and Graphic Arts II, SPIE vol. 1912, Jun. 18, 1993, pp. 299-309.
Morovic et al., "Cross-Media Psychophysical Evaluation of Gamut Mapping Algorithms", 8th Congress of the international Colour Association, Kyoto, Japan May 25, 1997, pp. 594-597.

* cited by examiner

LIGHTNESS MAPPING IN TWO STEPS

REFERENCE TO RELATED EUROPEAN APPLICATION

This application claims priority from European No. 16305033.9, entitled "Lightness Mapping In Two Steps," filed on Jan. 15, 2016, the contents of which are hereby incorporated by reference in its entirety.

TECHNICAL FIELD

The invention concerns a method for mapping colors of a source color gamut into a target color gamut that is based on the cusp colors of the source and target color gamut.

BACKGROUND ART

The aim of a color gamut mapping is to redistribute the source colors belonging to a source color gamut (for example the extended color gamut of a film) into a target color gamut (for example the color gamut of a standard television monitor). As the shape and boundaries of a target color gamut are generally different from those of the source color gamut, at least some of the target colors that are obtained after such a mapping are different from their corresponding source colors.

An application area of color gamut mapping is notably video content production and post-production. For example, an original version of a video content may need to be converted into different versions adapted for different types of reproduction or transmission: for example, a specific version for cinema, another for television, and a third one for internet. These different versions can be prepared by manual color correction or/and by application of gamut and tone mapping algorithms.

Among the requirements for color gamut mapping are notably:
- preservation of color neighborhood and order, absence of color banding and false contours, in order, notably, to prevent from incoherent reproduction of grey and color ramps;
- continuity of color and absence of visible quantization or clipping errors, in order, notably, to prevent from banding and false contours;
- separate control for lightness, hue and saturation for keeping the full artistic control on how colors are modified, and for allowing the formulation of a higher, semantic level of artistic intents.

In order to define a color gamut mapping, a gamut boundary description (GBD) of the source color gamut and of the target color gamut is generally required. Such a GBD of a color gamut defines the boundary surface of this color gamut in a color space. GBDs comprise generally explicit, generic 3D representations such as triangle meshes or volume models. For instance, a GBD of a color gamut can be based on a mesh of triangles, each triangle being defined by its three vertices in the color space of this GBD, these vertices corresponding to colors located on the boundary of the color gamut.

As illustrated by dotted lines on FIG. 1 in a RGB color space, in case of a color gamut of a trichromatic display or a trichromatic camera, cusp lines usually correspond to singular lines ("edges") linking each primary color of this display or camera with a secondary color having this primary color as a component, namely a singular line linking: red with yellow, red with magenta, green with yellow, green with cyan, blue with cyan and blue with magenta. The "cusp line" of a color gamut is a line joining cusp colors of this gamut. When the color gamut is represented in a color space having an axis for chroma such as Lab or JCh color space, a cusp color is a color of maximum Chroma (i.e. maximum saturation) in this color gamut and in a plane defined by a constant hue in this color space. In Lab color space for example, chroma is defined to be the square root of the sum of the squares of a and b, respectively. A plane defined by a constant hue is generally named "constant hue leaf". More generally, cusp colors correspond to singular points ("vertices") or singular lines ("edges") on the boundary surface that limits a color gamut. The cusp line of a color gamut can be generally modeled as a line joining different cups colors that forms a closed polygon on the gamut boundary of this color gamut.

As illustrated by solid lines on FIG. 1, "rims" of a color gamut correspond to the high-lightness ridges of this color gamut linking the white point of this color gamut to the secondary colors and to the low-lightness ridges linking the black point of this color gamut to the primary colors. For example, a yellow rim of a color gamut starts at the white point and ends at the yellow secondary color. The colors on this yellow rim include white, yellowish whites, pales yellows, saturated yellows and finally the yellow secondary color itself.

A cusp line or a rim of a color gamut include generally singular points that correspond generally to non-continues curvature of the gamut boundary of the color gamut.

On FIG. 1, cusp lines (dotted lines) and rims (solid lines) of the color gamut are by definition straight lines, because these lines are represented in the RGB color space defined by the device having the primary and secondary colors. The same lines are generally not straight when represented for instance in a Lab color space.

When trying to define a method of color gamut mapping (or algorithm: "GMA") source colors inside a source color gamut (having its own source cusp line and source rims) into target colors such they are located inside a target color gamut (having its own target cusp line and target rims), notably in order to take advantage of the whole range of colors in the target color gamut, it is known to define the GMA according different conditions among which the following cusp mapping condition: any source cusp color should be mapped into a target cusp color. More generally, a GMA can be defined in reference to pairs of source cusp colors and target cusp colors. Such color mapping methods are known as "cusp color gamut mapping". The general diagram shown on FIG. 4 illustrates such a cusp color gamut mapping where the color mapping is performed in a mapping color space different from that of a source device and from that of a target—or destination—device, requiring the use of a source display model to transform RGB color coordinates representing source colors in the RGB color space of this source device into a representation of these colors in the mapping color space, and the use of an inverse target display model to transform representation of mapped colors in the mapping color space into R'G'B' color coordinates representing mapped colors in the R'G'B' color space of this destination device.

US2007/236761 discloses a mapping method using cusp colors of a color gamut. In the disclosed method, a simplified cusp representation is used where cusp colors that are different from primary and secondary colors of the color gamut are interpolated from primary and secondary colors. In the disclosed method, a color ([0104] "point A") is mapped ([0104] 'chroma dependent lightness mapping") to a mapped color ([0104] "point B"). The mapped color has a lightness that is closer to the lightness of a cusp point of the constant-hue leaf of the color to map ([0104] "lightness compression toward primary cusp point"). This cusp point is that of a target gamut and is identical to the cusp point of a source gamut of the same hue leaf (FIG. 12b: "both cusp points") after a cusp point mapping in this constant-hue leaf ([0059] "the source primary cusp point is mapped to the destination primary cusp point") and after mapping of black and white points of the source gamut to the black and white points, respectively, of the target gamut (FIG. 11: "lightness rescaling"). The lightness mapping then depends on the unique black point, the unique white point and the unique cusp point in the constant-hue leaf in which the lightness mapping is performed.

A drawback of the color mapping method disclosed in US2007/0236761 is that it is based on a unique cusp point and not at least on two different cusp points, those of source and target color gamuts.

US2005/248784 discloses a color gamut mapping method called shear mapping that maps in a constant hue leaf the cusp of the source gamut to the cusp of the target gamut. However, after the shear mapping, colors different from the cusp color may still lie outside of the target (or "destination") color gamut. For such a situation, US2005/248784 discloses an additional step that further map colors 610 that lie outside the target color gamut to the closest colors 610' of the target color gamut, see FIG. 10 of US2005/248784 reproduced as FIG. 2 below. The document EP2375719 discloses also such an additional mapping step.

A drawback of the gamut mapping method disclosed in US2005/248784 is that this additional clipping step destroys image details and color neighborhood.

SUMMARY OF THE INVENTION

An object of the invention is to avoid the aforementioned drawbacks, by proposing a color gamut mapping method that maps source color from a source color gamut into a target color gamut using the following three steps illustrated on FIG. 5:
1. Lightness-mapping source colors into first lightness-mapped colors such that lightnesses of source cusp colors are mapped to lightnesses of corresponding target cusp colors;
2. Lightness-mapping first lightness-mapped colors in inverse direction—compared to the first step above—resulting in second lightness-mapped colors such that—in the mean—the second lightness-mapped colors are more numerous to be distributed in the target gamut than the first lightness-mapped colors and/or are located closer to the boundary of the target gamut;
3. Optionally, chroma-mapping the second lightness-mapped source colors into final target colors such that these target colors are all within the target color gamut.

The first step above is known from US2005/248784 that maps the cusp colors of the source gamut to the cusp colors of the target gamut, i.e. after mapping, the mapped cusp colors of the source gamut have the same lightness as the cusp colors of the target color gamut, respectively for each constant-hue leaf.

The second step provides a novel correction to the first step providing second mapped colors that are more numerous in the target color gamut or closer to the boundary of the target color gamut. In this way, the change of chroma resulting from the third step will be advantageously weaker.

The third optional step includes any method known from prior art that fits the requirement of mapping the second mapped source colors into the target color gamut. This step is needed in practical applications in order to process the target colors in another system being limited to the target color gamut, for example a target display, a target file format or a target color standard. Preferably we use here a well-known chroma mapping method that avoids clipping.

More precisely, a subject of the invention is a method of color gamut mapping source colors into targets colors from a source color gamut towards a target color gamut in a gamut mapping color space that can be partitioned into 2D constant-hue leaves having axes for lightness and chroma, said method comprising:

first lightness mapping each source color into a first lightness-mapped color having a lightness L' according to a first lightness mapping function $f_1(C,L)$ associated with the constant-hue leaf comprising said source color, wherein said lightness mapping function is defined such that a source cusp color defined as a color having a highest color chroma $C_C^{SOURCE}$ in said constant-hue leaf and in said source color gamut is lightness mapped according to said function into a target cusp color defined as a color having a highest color chroma $C_C^{TARGET}$ in said constant-hue leaf and in said target color gamut, and, when said first lightness-mapped color is located out of said target color gamut:

second lightness mapping said first lightness-mapped color into a second lightness-mapped color such that this second lightness-mapped color is located inside said target color gamut or outside said target color gamut but closer to the boundary of said target color gamut than before said second lightness-mapping, and such that any two different first mapped colors that are second lightness-mapped are second lightness-mapped into different second lightness-mapped colors gamut.

The second lightness mapping step significantly enhances the result of the first lightness mapping step and allow notably a colorist a broader range of chroma variations in a third step of chroma mapping (see below). For example in a case where the target color gamut is included within the source color gamut, if the first lightness mapping step reduces the lightness of source colors, colors close to the source cusp line but having smaller lightness than the source cusp line are moved away from the target color gamut. This effect is reduced by the second lightness mapping step.

The above definition of the source cusp color and of the target cusp color encompasses the intersection of the constant hue leaf with, respectively, a source cusp line and a target cusp line. These cusp lines can be obtained by any known methods, including through metadata.

Preferably, said second lightness mapping is defined such that it maps lightness in opposite lightness direction of said first lightness mapping.

The main feature differentiating the invention from US2007/236761 is that, instead of performing a cusp mapping as in US2007/236761 (A→B step 804, even including the B→C step 805) inferring variations both of lightness and of chroma, the first and second steps of the invention propose a cusp-oriented step where only the lightness varies. This gamut mapping method is notably advantageous with respect to the color gamut mapping methods disclosed in US2007/236761 and US2005/248784 in that the second lightness-mapped colors match better the target color gamut.

Moreover, if this method is combined with a specific algorithm from prior art that allows the detection of the source and target cusp lines (see for instance the "preliminary step" as described below), an optional improvement is obtained over US2007/236761, as the actual cusp may be considered, instead of a linear interpolation of the primary and secondary colors such as in US2007/236761. This is an advantage when the lines along which the cusp colors are distributed are not straight.

Preferably, the method of color gamut mapping comprises third mapping said second lightness-mapped color or said first lightness-mapped color when it is not second lightness-mapped into a final target color, wherein said first and second lightness-mapping keep unchanged hue and chroma, wherein said third mapping is defined such that said target color is within said target color gamut and keeps unchanged hue and lightness.

In this third step, the range of chroma variations offered for instance to a colorist is advantageously broader than in a mapping method of the prior art, without the second lightness-mapping step.

Any known Gamut Mapping Algorithms may be used for this third mapping. Preferably, said third mapping is a chroma mapping with no change of lightness and no change of hue.

Advantages of the color gamut mapping method includes:
1. With respect to known cusp gamut in US2005/248784, the new, "inverse" lightness-mapping step changes less the lightness of source colors and thus better preserves the lightness of source colors (artistic intent);
2. With respect to known cusp gamut in US2005/248784, the new "inverse" lightness-mapping step changes the distance of second mapped colors to the target color gamut and thus requires less additional mapping in the third step.
3. With respect to US2005/248784, clipping can be avoided when using for the third mapping non-clipping methods from prior art, thus less degrading picture quality. When such a third mapping is applied to the second lightness-mapped colors, the advantageous characteristic of the second lightness mapping better preserves image details and color neighborhood than prior art.

The color gamut mapping method is notably applicable to professional color processing software, and allows advantageously the colorist to be free to choose any chroma variations, instead of depending of an automatic cusp mapping as in US2007/236761. Thanks to the invention, as at least two steps of the color gamut mapping is limited to variations of the lightness with chroma and hue conservation, the colorist is totally free to choose any chroma variations in a third mapping step. A high semantic level of artistic intents is then offered to the colorist, notably because a separate control for lightness, hue and saturation is provided.

Preferably, said second lightness mapping is defined by a second lightness mapping function that correspond to said first lightness mapping function multiplied by a negative number in the interval]−1, 0[.

In another variant, said second lightness mapping is defined by a second lightness mapping function $f_{2.1}(C,L)$ which is zero for those values of L that match one of the following cases:

$$f_{2.1}(C, L) = \begin{cases} 0 & L > L_C'^{SOURCE} \wedge L_C^{TARGET} < L_C^{SOURCE} \wedge C_C^{TARGET} < C_C^{SOURCE} \\ 0 & L < L_C'^{SOURCE} \wedge L_C^{TARGET} > L_C^{SOURCE} \wedge C_C^{TARGET} < C_C^{SOURCE} \\ 0 & L > L_C'^{SOURCE} \wedge L_C^{TARGET} > L_C^{SOURCE} \wedge C_C^{TARGET} > C_C^{SOURCE} \\ 0 & L < L_C'^{SOURCE} \wedge L_C^{TARGET} < L_C^{SOURCE} \wedge C_C^{TARGET} > C_C^{SOURCE} \end{cases}$$

where $L'^{SOURCE}_C$ is the lightness of the first mapped source cusp color, and which is non-zero for the other values of L that match the following cases:

$$f_{2.1}(C, L) = \begin{cases} g\left(\dfrac{L-B'}{L_C'^{SOURCE}-B'}\right) & L < L_C'^{SOURCE} \wedge L_C^{TARGET} < \\ & L_C^{SOURCE} \wedge C_C^{TARGET} < C_C^{SOURCE} \\ -g\left(1-\dfrac{L-L_C'^{SOURCE}}{W'-L_C'^{SOURCE}}\right) & L > L_C'^{SOURCE} \wedge L_C^{TARGET} > \\ & L_C^{SOURCE} \wedge C_C^{TARGET} < C_C^{SOURCE} \\ -g\left(\dfrac{L-B'}{L_C'^{SOURCE}-B'}\right) & L < L_C'^{SOURCE} \wedge L_C^{TARGET} > \\ & L_C^{SOURCE} \wedge C_C^{TARGET} > C_C^{SOURCE} \\ g\left(1-\dfrac{L-L_C'^{SOURCE}}{W'-L_C'^{SOURCE}}\right) & L > L_C'^{SOURCE} \wedge L_C^{TARGET} < \\ & L_C^{SOURCE} \wedge C_C^{TARGET} > C_C^{SOURCE} \end{cases}$$

where g is a basic mapping function according to $$g(m)=|L_C^{TARGET}-L_C^{SOURCE}|[1-4(m-0.5)^2].$$

Preferably, said first lightness mapping function depends on a parameter t representative of the difference between the lightness L of the source color to map and the lightness ($L_B^{SOURCE}$) of the black point of the source color gamut, or between the lightness L of the source color to map and the lightness ($L_W^{SOURCE}$) of the white point of the source color gamut.

Preferably, said first lightness mapping function depends on a parameter u representative of the ratio between the chroma C of the source color to map and the chroma ($C_C^{SOURCE}$) of said source cusp color of the leaf of said constant hue h.

A subject of the invention is also a Color processing device for mapping source colors of a content into targets colors from a source color gamut towards a target color gamut, comprising:

a lightness-mapping function definition module configured to define, for source colors located in a same leaf of constant-hue h, a first lightness-mapping function $f_1(C,L)$ adapted to lightness-map any of these source colors such that a source cusp color defined as a color having a highest color chroma in said constant-hue leaf and in said source color gamut is lightness-mapped according to said function into a target cusp color defined as a color having a highest color chroma in said constant-hue leaf and in said target color gamut, wherein said lightness-mapping function definition module is further configured to define, for colors located in a same leaf of constant-hue h, a second lightness-mapping function $f_2(C', L')$ adapted to lightness-map these colors inside said target color gamut or outside said target color gamut but closer to the boundary of said target color gamut than before said second lightness-mapping, and such that any two different first mapped colors that are second lightness-mapped are second lightness-mapped into different second lightness-mapped colors, a mapping module configured to apply said first lightness-mapping function $f_1(C,L)$ then said second lightness-mapping function $f_2(C', L')$ to said source colors located in said leaf of constant-hue h such as to output second lightness-mapped colors.

Preferably, said lightness-mapping function definition module is further configured to define a third chroma-mapping function keeping unchanged hue and lightness, and wherein said mapping module is further configured to apply said third lightness-mapping function to colors obtained by the application of said second lightness-mapping function.

Preferably, the Color processing device also comprises a cusp line module configured to obtain, from said source color gamut, a source cusp line and, from said target color gamut, a target cusp line, and wherein said lightness-mapping function definition module is further configured to define said source cusp color as the intersection of said constant-hue leaf with said source cusp line provided by said cusp line module; and to define said target cusp color as the intersection of said constant-hue leaf with said target cusp line provided by said cusp line module.

A subject of the invention is also a processor readable medium having stored therein instructions for causing a processor to perform the method of color gamut mapping as defined above.

A subject of the invention is also a computer-readable program comprising computer-executable instructions to enable a computer to perform the method of color gamut mapping as defined above.

A subject of the invention is also an electronic device incorporating the above image processing device, such as a camera, a smartphone, a tablet, a TV set, a set-top-box, a gateway and a server.

BRIEF DESCRIPTION OF DRAWINGS

The invention will be more clearly understood on reading the description which follows, given by way of non-limiting example and with reference to the appended figures in which.

DESCRIPTION OF EMBODIMENTS

Figure 5:
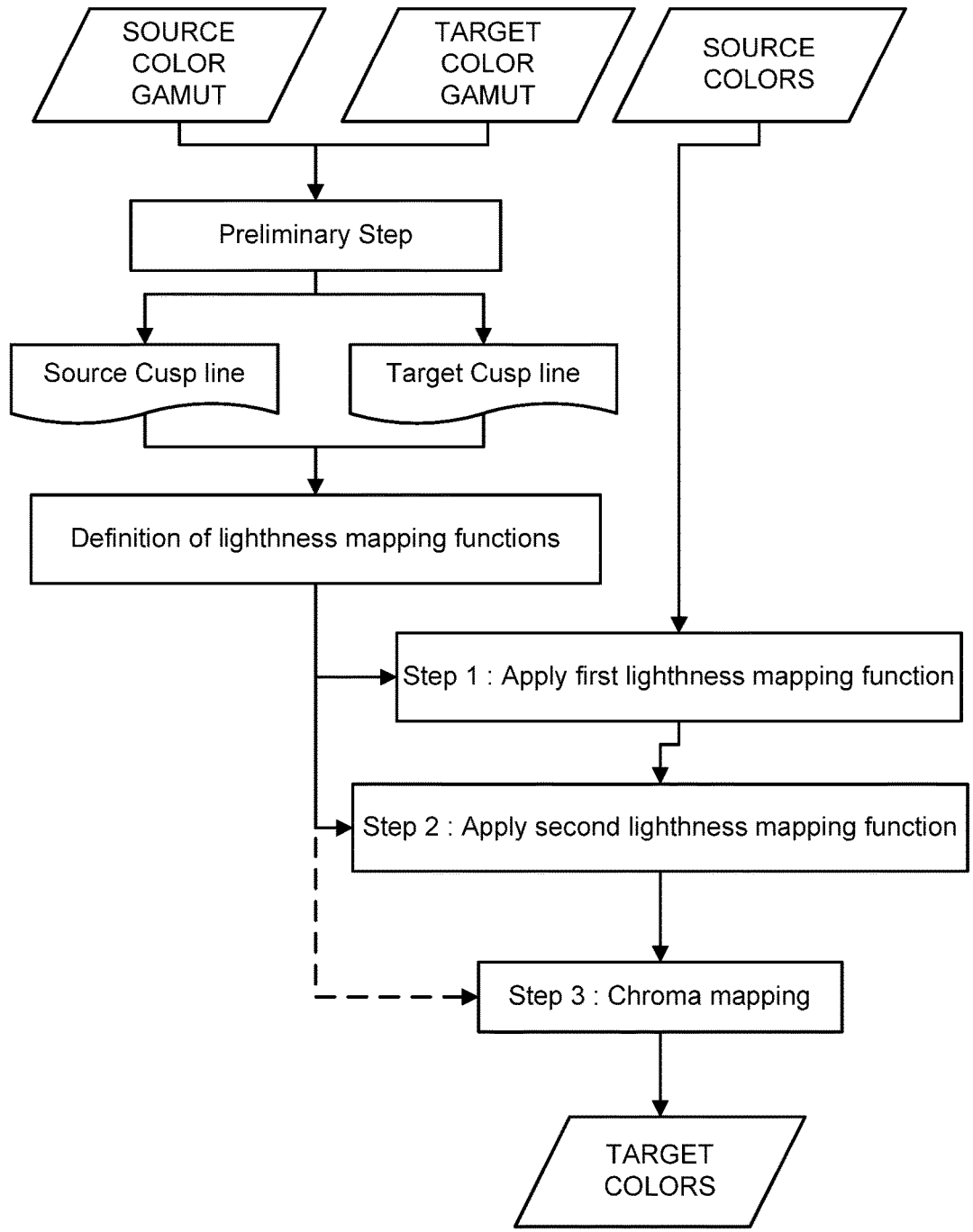
FIG. 5 shows a flow chart of a general embodiment of the color gamut mapping method of the invention.

The functions of the various elements shown in FIG. 5 may be provided in a color processing device through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage. Other hardware, conventional and/or custom, may also be included.

Moreover, the software may be implemented as an application program tangibly embodied on a program storage unit. The application program may be uploaded to, and executed by, a color processing device comprising any suitable architecture. Preferably, the color processing device is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

This color processing device comprises notably:

a cusp line module configured to obtain, from a source color gamut, a source cusp line and, from a target color gamut, a target cusp line;

a lightness-mapping function definition module configured to define a first lightness-mapping function, a second lightness-mapping function, and optionally a third chroma-mapping function;

a mapping module configured to apply the different mapping functions provided by the lightness-mapping function definition module to source colors to map.

This color processing device may be notably incorporated in an electronic device such as a camera, a smartphone, a tablet, a TV set, a set-top-box, a gateway and a server.

Figure 4:
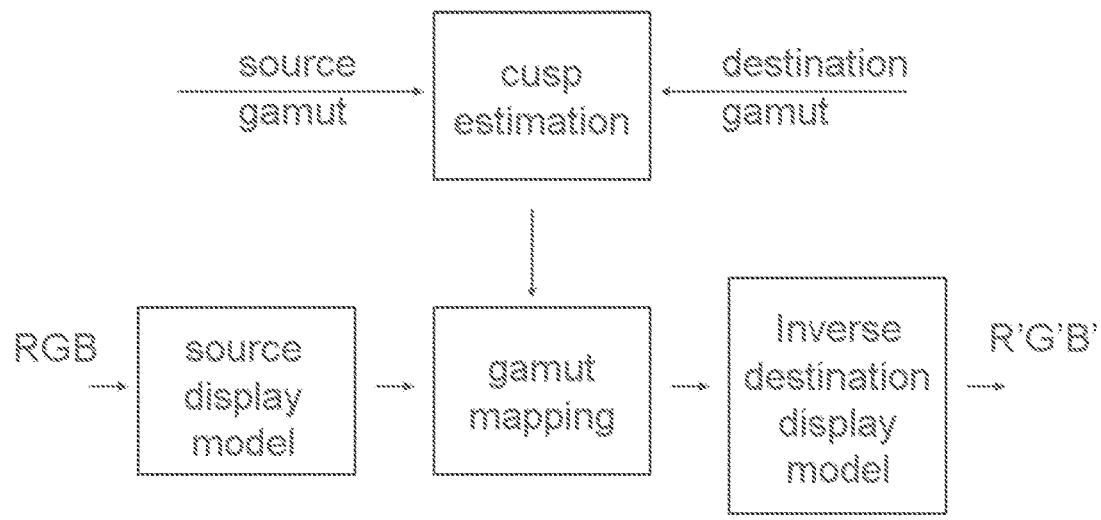
FIG. 4, already mentioned, shows a general flow chart of a cusp color gamut mapping method according to prior art.

An embodiment of the color gamut mapping method of the invention will now be described in reference to the gamut mapping framework shown in FIG. 4. It includes classical color management tools such as source and target display models. New tools are notably the second lightness mapping step, which is described below.

As mapping color space, the CIE 1976 Lab color space is chosen. A Lab color space is a color-opponent space that is perceptually uniform, with dimension L for lightness and a and b for the color-opponent dimensions. The red/green opponent primary colors are represented along the a axis, with green at negative a values and red at positive a values. The yellow/blue opponent secondary/primary colors are represented along the b axis, with blue at negative b values and yellow at positive b values.

In this color space, colors can also be represented by polar coordinates, i.e. in a LCh mode, with L for the same lightness, the hue angle h according to $$h = \begin{cases} \operatorname{atan}(b/a) & a > 0 \wedge b > 0 \\ \pi/2 - \operatorname{atan}(a/b) & a \leq 0 \wedge b > 0 \\ 3\pi/2 - \operatorname{atan}(a/b) & a > 0 \wedge b \leq 0 \\ \pi + \operatorname{atan}(b/a) & a \leq 0 \wedge \leq 0 \end{cases}$$

i.e. the angle between the vector having a, b as coordinates and the a-axis, $C=\sqrt{a^2+b^2}$ corresponding to the chroma, i.e. the saturation of the color. The higher the C value the more saturated is the color. The hue angle may be also named $\alpha_H$.

Other color spaces such as the appearance-based space JCh according to CIECAM-02 can be used for the mapping. Furthermore, the below embodiment concerns a hue-preserving cusp color gamut mapping. This means that the color mapping is not actually carried out in three dimensions in Lab space but in two dimensions in a constant-hue leaf of the Lab space, i.e. in a 2D LC color space. The hue defining the constant-hue leaf in which the color mapping is to be performed is chosen to be the hue of the source color to be mapped.

The source GBD used to describe the source color gamut comprising source colors to map is based in a manner known per se on a mesh of triangles, each triangle being defined by the position of its three vertices in the mapping color space, these vertices being source colors located on the boundary of the color gamut. The source color gamut can correspond to a specific or standard display device such as a LCD or an OLED panel, to a specific content to map, to an image capture device such as a camera or a scanner, or to any other color device.

The target GBD used to describe the target color gamut in which source colors are to be mapped is also based in a manner known per se on a mesh of triangles, each triangle being also defined by the position of its three vertices in the mapping color space, these vertices being target colors located on the boundary of the color gamut. The target color gamut can correspond for instance to a specific or standard display device or to a printer.

Gamut Boundary Descriptions can be convex or non-convex, but in the embodiment below, it is assumed that source and target GBDs are both approximately convex.

Figure 1:
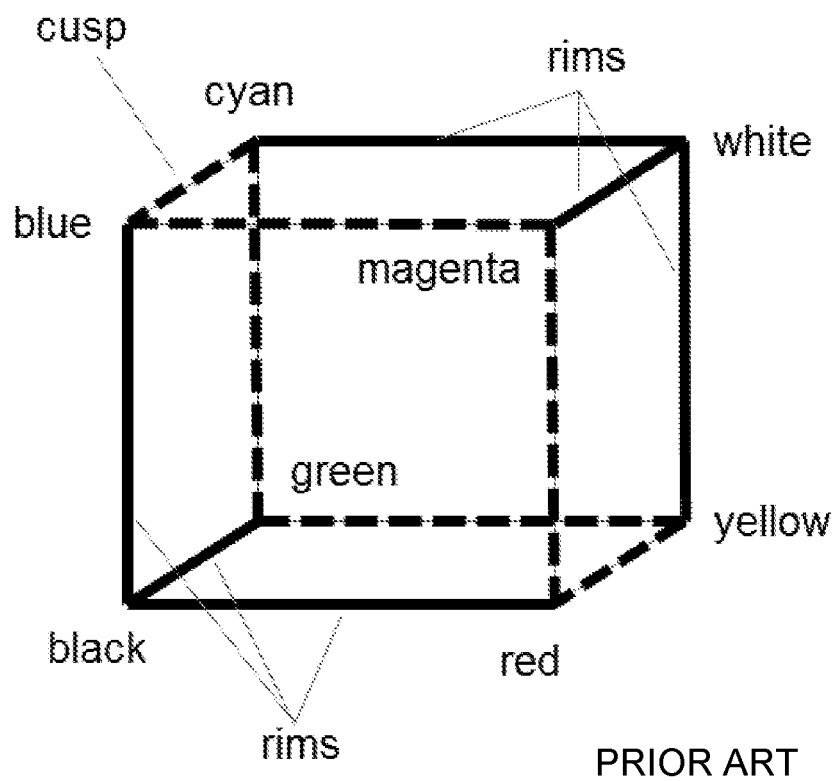
FIG. 1, already mentioned, illustrates the cusp line and the rims of a color gamut in a RGB color space.
Figure 2:
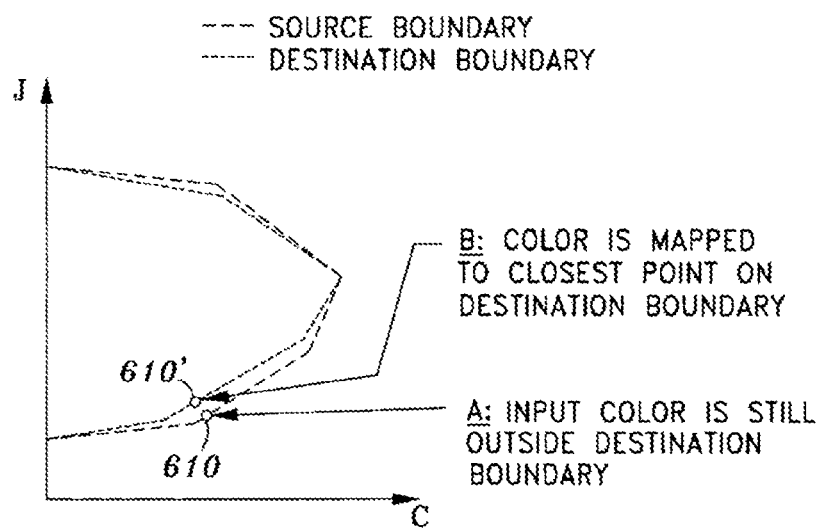
FIG. 2, already mentioned, illustrates a step of a color gamut mapping method according to the prior art.
Figure 3:
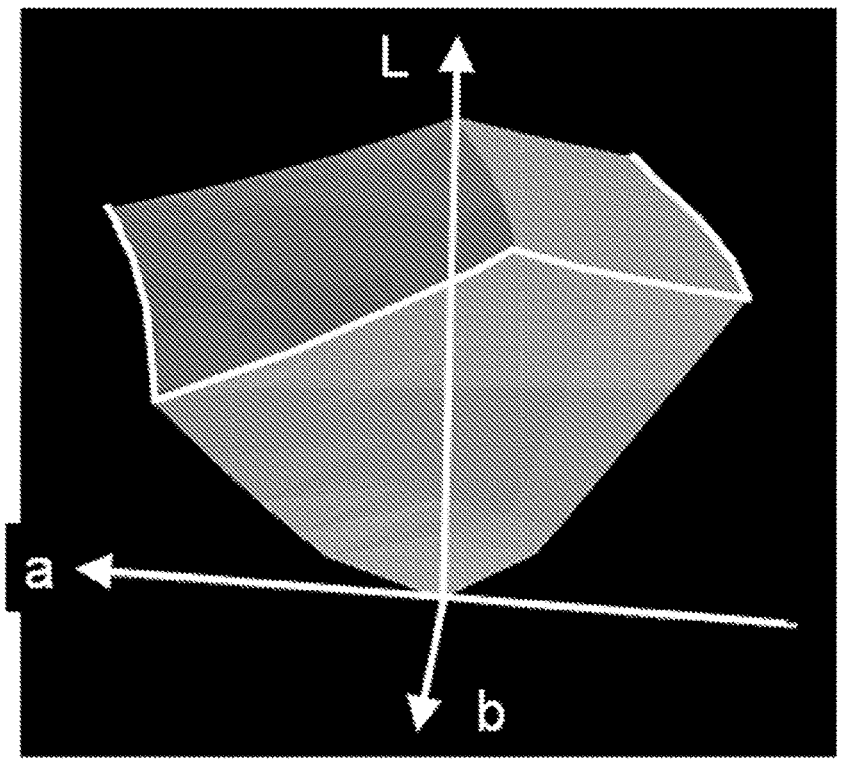
FIG. 3 illustrates a cusp line of a color gamut in a Lab color space.

Furthermore, as illustrated on FIG. 3, the primary colors, the secondary colors, the black point and the white point of the two color gamuts are supposed to be known.

All these data, i.e. source GBD, target GBD, with their primary colors, secondary colors, black points and white points may be transmitted to the application program implementing the color gamut mapping method through metadata.

Preliminary Step: Obtaining Cusp Lines of the Source and Target Color Gamuts:

This preliminary step is performed by the cusp line module.

The cusp line of each color gamut is defined by a line joining cusp colors of this color gamut, whereas each cusp color is defined to be the color within this color gamut with the highest color saturation C compared to all other colors in the constant-hue leaf having the same hue h as this cusp color. Using GBDs based on triangles represented by their vertices as defined above, the cusp line of a color gamut is then described by a series of vertices of these triangles that meet this highest color saturation requirement. The vertices of this series then form a closed polygon that circumscribes in a certain manner the gamut boundary description. This closed polygon is the cusp line.

In the implementation described below, the same method of obtaining cusp lines is used for the source color gamut and for the target color gamut. Any known method of obtaining cusp lines can be used, for instance the method described by Stauder et. al. in their article entitled "Gamut Mapping for Motion Picture" published at the Conference on Colour in Graphics, Imaging and Vision, Jun. 14-18, 2010. According to this known method, in order to obtain the cusp line of each of the source and target color gamuts from their GBDs, the following steps described in this article are implemented:

1. Detection of a first current cusp vertex as the vertex of the gamut boundary description (GBD) having the highest color saturation C;
2. For each of neighboring vertices of this GBD located in the neighborhood of this current cusp vertex, calculation of the value of a quality criterion (example of a definition is given further down), said neighborhood being defined by all vertices that are linked to the current cusp vertex by an edge of a triangle of this GBD;
3. From these neighboring vertices, selection of the vertex of the neighborhood having the highest value of this quality criterion as being a cusp color of the cusp line;
4. If this selected vertex satisfies a stop criterion (example of a definition is given further down), the whole cusp line of this color gamut is considered as obtained; if the stop criterion is not satisfied, the selected vertex is overtaken as current cusp vertex and steps 2 to 4 above are reiterated up to a last selected vertex satisfies the stop criterion.

From the first current cusp vertex up to the last selected vertex of iterations of the above steps, a series of cusp vertices corresponding to cusp colors is then obtained, said series forming a closed polygon that circumscribes in a certain manner the color gamut and describes the cusp line of the color gamut.

The white line which forms a polygon on FIG. 3 (partially shown) describes the cusp line of the color gamut shown on this figure that is obtained through the above method. The color gamut is that of an ideal color-additive display device.

Still in reference to the article from Stauder et al. already quoted above, an example of definition of a quality criterion K will now be given, based on a combination of four sub criteria, which are: a saturation criterion $K_S$, a lightness similarity criterion $K_I$, a hue angle increase criterion $K_H$, and a collinearity criterion $K_D$.

The saturation criterion $K_S$ is defined such as to find the most saturated cusp vertices of a neighborhood. The value of the saturation criterion $K_S$ of a vertex V belonging to the neighborhood of a current cusp vertex $\hat{V}$ is defined as follows:

$$K_S = \frac{C(1 + D/c_2)}{c_1}$$

where $$V = \begin{pmatrix} L \\ a \\ b \end{pmatrix}, \hat{V} = \begin{pmatrix} \hat{L} \\ \hat{a} \\ \hat{b} \end{pmatrix},$$

where $D = |V - \hat{V}| = \sqrt{(L-\hat{L})^2 + (a-\hat{a})^2 + (b-\hat{b})^2}$ is the distance, in the Lab color space, between the neighboring vertex V and the current cusp vertex $\hat{V}$, and where the values for the constant coefficients $c_1$, $c_2$ can be for instance $c_1=150$ and $c_2=50$.

The lightness similarity criterion $K_I$ is defined such as to find cusp vertices of a neighborhood having a similar lightness L along the cusp line. The value of the lightness similarity criterion $K_I$ of a vertex V belonging to the neighborhood of a current cusp vertex $\hat{V}$ is based on the difference between the lightness of the neighboring vertex L and that of the current vertex $\hat{L}$ and is defined as follows:

$$K_I = 1 - \frac{(L-\hat{L})^2}{(c_3)^2}(1 + D/c_2),$$

where the value for the constant coefficient $c_3$ may be for instance $c_3=100$.

The hue angle increase criterion $K_H$ is defined such as to find cusp vertices of a neighborhood that increase in hue angle, in order to get a cusp line description formed by a closed and smooth cusp polygon. The value of the hue angle increase criterion $K_H$ of a vertex V belonging to the neighborhood of a current cusp vertex $\hat{V}$ is defined as follows:

$$K_H = \frac{\alpha_H - \hat{\alpha}_H}{c_4}$$

where $\alpha_H$ is the hue angle of the vertex V as defined above (also named h), where $\hat{\alpha}_H$ is the hue angle of the vertex V that is defined in the same manner as $\alpha_H$ while using the coordinates â, b̂ instead of a,b, respectively,
where the value for the constant coefficient $c_4$ can be for instance $c_4$=90.

The collinearity criterion $K_D$ is defined such as to find cusp vertices of a neighborhood in a direction as close as possible to the direction of the previous iteration of the method as defined above to obtain the cusp line, in order to still improve the smoothness of the cusp polygon. The value of the collinearity criterion $K_D$ of a vertex V belonging to the neighborhood of a current cusp vertex $\hat{V}$ which has been itself selected in a previous iteration in the neighborhood of a previous current cusp vertex V''' is defined for instance as follows:

$$K_D = 1 - \alpha_D/c_5$$

where $\alpha_D = \angle\{d; \hat{d}\}$, i.e. the angle between a first direction vector $\hat{d} = \hat{V} - V'''$ and a second direction vector $d = V - \hat{V}$, and where the value for the constant coefficient $c_5$ can be for instance $c_5$=90.

The value of the quality criterion K of a vertex V belonging to the neighborhood of a current cusp vertex $\hat{V}$ is then calculated for instance according to the formula:

$$K = c_S K_S + c_H K_H + c_I K_I + c_D K_D + c_C K_C,$$

where the value for the weight coefficient s are for instance $c_S$=5, $c_H$=5, $c_I$=2 and $c_D$=2.

Still in reference to the article from Stauder et al. already quoted above, an example of definition of a stop criterion to be applied to a selected vertex will now be given as follows:
Either, the selected vertex is identical with the first current cusp vertex; in this situation, the cusp line is then considered as closed into a polygon;
Or the selected vertex has an associated hue angle $\alpha_H$ that is larger than the hue angle of this current cusp vertex augmented by 360 degrees.

1$^{st}$ Step: First Lightness Mapping:
This step is implemented by the mapping module.
The cusp information of the preliminary step above is then used for a first lightness mapping according to prior art, for instance as described in the article entitled "Motion Picture Versioning by Gamut Mapping" by J. Stauder et al., published in November 2010 in the Eighteenth Color and Imaging Conference: Color Science and Engineering Systems, Technologies, and Applications, San Antonio, Tex., p. 178-183.

Figure 6:
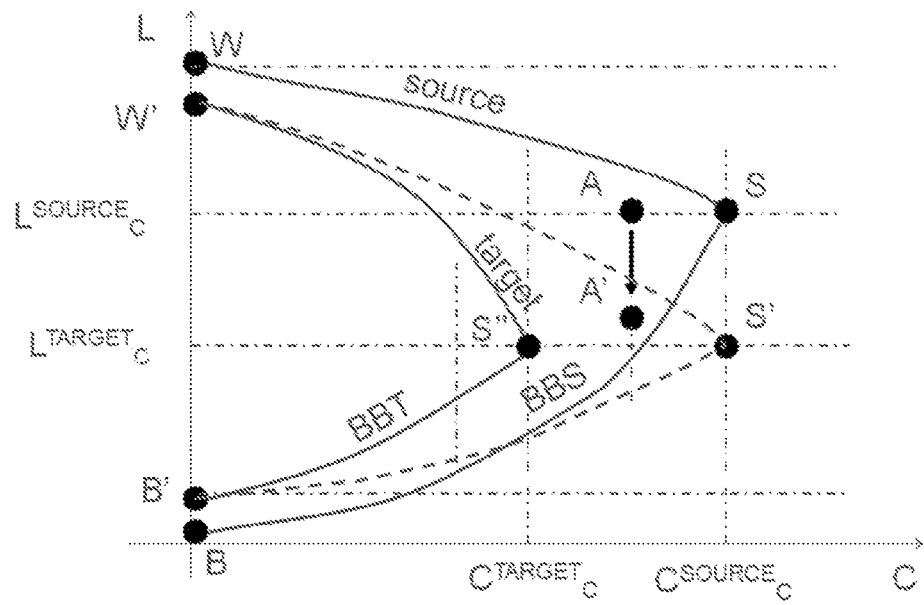
FIG. 6 illustrates, in a constant-hue leaf, the first lightness-mapping step of the general embodiment of FIG. 5.

To perform this first step, using the lightness-mapping function definition module, a first lightness mapping function $f_1(C,L)$ of a constant-hue leaf is defined to map the lightness L of any source color of this leaf such as to satisfy the following so-called "cusp lightness condition": as illustrated on FIG. 6, a source color S defined by the intersection of this constant-hue leaf with the source cusp line determined by the preliminary step above, having a lightness $L_C^{SOURCE}$ and a chroma $c_C^{SOURCE}$, is lightness mapped in this leaf into a color S' defined by the intersection of this constant-hue leaf with the target cusp line determined by the preliminary step above, having a lightness $L_C^{TARGET}$. It means that, in this leaf, the function $f_1(C,L)$ is defined such that $f_1(C_C^{SOURCE}, L_C^{SOURCE}) = L_C^{TARGET}$.

Moreover, as a non-limiting example, this first lightness mapping function $f_1(C,L)$ to be applied to all source colors belonging to this constant-hue leaf is for instance further defined according to the following linear equation:

$$f_1(C,L) = sL \quad \text{(Eq. 1)},$$

where the linear lightness factor s is for instance defined as follows:

$$s = tu\frac{L_C^{TARGET}}{L_C^{SOURCE}} + (1 - tu). \quad \text{(Eq. 2)}$$

where the linear lightness weight t and the linear chroma weight u are defined as follows:

$$t = \begin{cases} \dfrac{L - L_B^{SOURCE}}{L_C^{SOURCE} - L_B^{SOURCE}} & \text{if } L \leq L_C^{SOURCE} \\ \dfrac{L_W^{SOURCE} - L}{L_W^{SOURCE} - L_C^{SOURCE}} & \text{if } L > L_C^{SOURCE} \end{cases} \quad \text{(Eq. 3A)}$$

$$u = \min\left\{1; \frac{C}{C_C^{SOURCE}}\right\} \quad \text{(Eq. 3B)}$$

where L and C are respectively the lightness and the chroma of the source color to be mapped, $L_W^{SOURCE}$ is the lightness of the white color W associated with the source color gamut, and $L_B^{SOURCE}$ is the lightness of the black color B associated with the source color gamut.

The first lightness mapping function $f_1(C,L)$ is then applied to source colors of the content to map. If each source color is represented in the mapping color space Lab by coordinates N, the resulting, first lightness-mapped color has the coordinates N', where:
if $$N = \begin{pmatrix} L \\ a \\ b \end{pmatrix},$$

then $$N' = \begin{pmatrix} L' = f_1(C, L) \\ a' = a \\ b' = b \end{pmatrix}$$

Note that the chroma is unchanged during this first step.
As shown on FIG. 6, if a color A has the same lightness as the source cusp ($L=L^{SOURCE}c$) but a smaller chroma ($C<C^{SOURCE}c$), it is lightness-mapped onto a color A' having a lightness superior to that of the target cusp ($L'=L^{TARGET}c$). According to the above definition of the first lightness mapping function $f_1(C,L)$, the amount of first lightness mapping is notably controlled by the lightness ratio of target and source cusps (ratio of target cusp L and source cusp L) as well as by the chroma of the color A compared to the chroma of the source cusp (chroma dependency factor).

More generally, still referring to FIG. 6, if all source colors are within the source color gamut delimited by the line joining B, S and W, all first mapped colors are then within a color gamut delimited by the dotted line joining B', S' and W', which is different from the target color gamut delimited by the line joining B', S" and W'. As can be seen on FIG. 6, following this first step, all source colors lying notably between the bottom boundary BBS of the source color gamut and the bottom boundary BBT of the target color gamut are lightness mapped into a first mapped color which is farther away from the target color gamut than the original source color. In such a situation, the application of a last step of chroma mapping (see below) may be problematic: when the lightness of a first mapped color is too close to the lightness of the black color B', applying a chroma mapping in the target color gamut will then give a final mapped chroma that may be considered as too small. An aim of the second step below is to reduce or compensate for these drawbacks.

$2^{nd}$ Step: Second Lightness Mapping:

When the first lightness-mapped color is outside the target color gamut, a second lightness mapping is performed before any subsequent chroma-mapping. This step is performed using the mapping module.

This second lightness mapping is defined such as to move a color in inverse lightness direction compared to the first step above, and such that the second mapped colors that are obtained are inside said target color gamut or outside said target color gamut but closer to the boundary of said target color gamut than before said second lightness-mapping. This second lightness mapping is further defined, when it applies, such that any two different first mapped colors are second lightness-mapped into different second lightness-mapped colors. Therefore, this second lightness mapping is different from a clipping process. Note that the chroma is unchanged during this second step.

Figure 7:
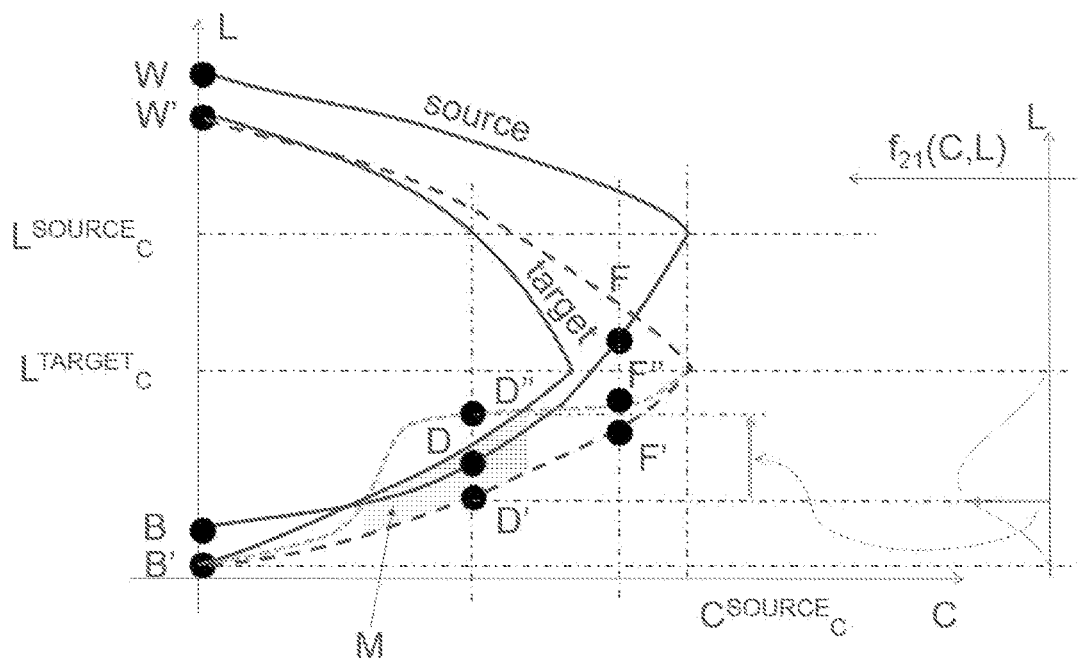
FIG. 7 illustrates, in a constant-hue leaf, the second lightness-mapping step of the general embodiment of FIG. 5.
Figure 8:
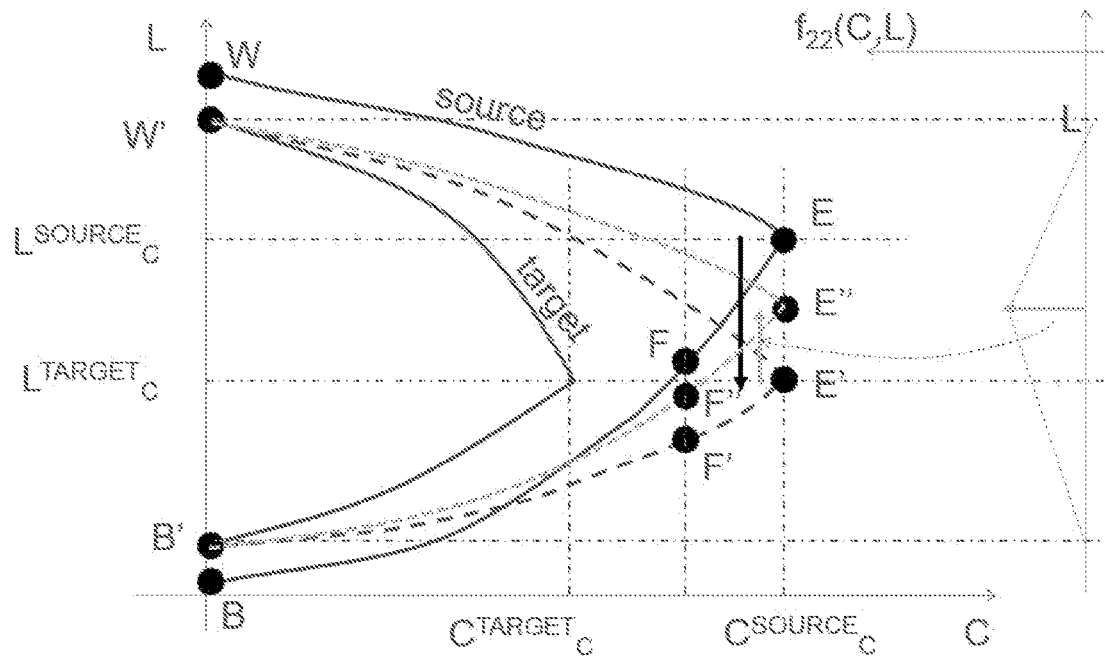
FIG. 8 illustrates, in a constant-hue leaf, a variant of the second lightness-mapping step of the general embodiment of FIG. 5.

In case of a target color gamut that is included within the source color gamut as shown for instance on FIGS. 6, 7 and 8, this second lightness-mapping step is thus defined such as to bring more colors in the target color gamut, i.e. to distribute more colors in this target color gamut that first mapped colors obtained from the $1^{st}$ step above. Distributing more colors in the target color gamut means that less colors keep outside the target color gamut. This is an advantage since then a reduced change of chroma may be applied in the third step that usually brings all colors into the target color gamut. A reduced chroma change in the third step is advantageous when preservation of source colors is requested. FIGS. 6, 7 and 8 show lightness mapping in a constant-hue leaf. It may happen that for some hues, referring to FIG. 6, the source colors that are within the source color gamut delimited by the line joining B, S and W, are all included within the target color gamut delimited by the line joining B', S" and W'—in this case $C_C^{TARGET} > C_C^{SOURCE}$ holds, and for other hues, the source colors that are within the source color gamut delimited by the line joining B, S and W, are not all included within the target color gamut delimited by the line joining B', S" and W'. If for a certain hue all target colors that are within the target color gamut delimited by the line joining B', S" and W' are included within the source color gamut delimited by the line joining B, S and W, $C_C^{TARGET} \leq C_C^{SOURCE}$ holds.

A non-limiting example for second lightness mapping is shown on FIG. 7. In this example, using the lightness-mapping function definition module, a second lightness mapping function $f_{2.1}(C,L)$ is defined such as to map first mapped source colors into second mapped source colors. As illustrated on FIG. 7, first lightness-mapped colors of a first class that are outside the target color gamut are second lightness-mapped into second mapped colors inside the target color gamut. For example, this first class is defined as a zone M located outside the target gamut. For example, D' located in this zone M but outside the target color gamut is second-lightness mapped into D" located inside the target gamut. Compared to known methods that clip out-of-gamut colors to the target gamut boundary, the second lightness mapping preserves images details. Specifically, any two different first mapped colors in the zone M are still different after the second lightness mapping while clipping may clip two different colors onto the same target gamut boundary color. As illustrated on FIG. 7 too, first lightness-mapped colors of a second class that are outside the target color gamut are second lightness-mapped into second mapped colors still outside the target color gamut closer to the target gamut boundary than before second lightness mapping. For example, this first class is defined by colors outside the zone M and outside the target gamut. For example, F' located is second-lightness mapped into F" still located outside the target gamut.

After such a second lightness-mapping, the obtained second lightness-mapped colors that are still located outside the target color gamut can be more easily mapped into the target gamut by a following chroma mapping.

Figure 9:
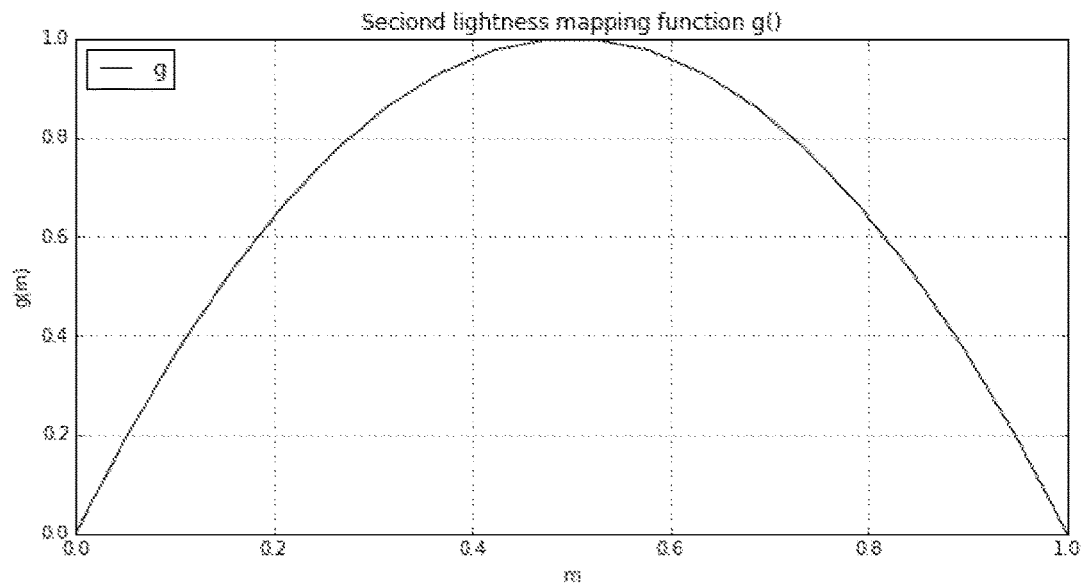
FIG. 9 illustrates a function g( ) used to define the second lightness-mapping function used in the first variant illustrated on FIG. 7.

In this first variant, the second lightness mapping function $f_{2.1}(C,L)$ is defined as follows. The function $f_{2.1}(C,L)$ is zero for those values of L that match one of the following cases:

$$f_{2.1}(C, L) = \begin{cases} 0 & L > L_C'^{SOURCE} \wedge L_C^{TARGET} \leq L_C^{SOURCE} \wedge C_C^{TARGET} \leq C_C^{SOURCE} \\ 0 & L \leq L_C'^{SOURCE} \wedge L_C^{TARGET} > L_C^{SOURCE} \wedge C_C^{TARGET} \leq C_C^{SOURCE} \\ 0 & L > L_C'^{SOURCE} \wedge L_C^{TARGET} > L_C^{SOURCE} \wedge C_C^{TARGET} > C_C^{SOURCE} \\ 0 & L \leq L_C'^{SOURCE} \wedge L_C^{TARGET} \leq L_C^{SOURCE} \wedge C_C^{TARGET} > C_C^{SOURCE} \end{cases}$$

where $L'_C{}^{SOURCE}$ is the lightness of the first mapped source cusp color. Note that the described first lightness mapping function ensures that this lightness is always equal to the lightness of the target color cusp according to $L'_C{}^{SOURCE} = L_C{}^{TARGET}$. The function $f_{2.1}(C,L)$ is non-zero for the other values of L that match the following cases:

$$f_{2.1}(C,L) = \begin{cases} g\left(\dfrac{L-B'}{L_C'^{SOURCE}-B'}\right) & L \leq L_C'^{SOURCE} \wedge L_C^{TARGET} \leq L_C^{SOURCE} \wedge C_C^{TARGET} \leq C_C^{SOURCE} \\ -g\left(1-\dfrac{L-L_C'^{SOURCE}}{W'-L_C'^{SOURCE}}\right) & L > L_C'^{SOURCE} \wedge L_C^{TARGET} > L_C^{SOURCE} \wedge C_C^{TARGET} \leq C_C^{SOURCE} \\ -g\left(\dfrac{L-B'}{L_C'^{SOURCE}-B'}\right) & L \leq L_C'^{SOURCE} \wedge L_C^{TARGET} > L_C^{SOURCE} \wedge C_C^{TARGET} > C_C^{SOURCE} \\ g\left(1-\dfrac{L-L_C'^{SOURCE}}{W'-L_C'^{SOURCE}}\right) & L > L_C'^{SOURCE} \wedge L_C^{TARGET} \leq L_C^{SOURCE} \wedge C_C^{TARGET} > C_C^{SOURCE} \end{cases}$$

where g is a basic mapping function—shown in FIG. 9, according to $$g(m) = |L_C^{TARGET} - L_C^{SOURCE}|[1 - 4(m-0.5)^2].$$

The basic mapping function g(m) is defined in the interval [0,1] where small values for m close to zero determine the second lightness mapping of colors close to black or white, where values of m close to one determine the mapping of colors in a hue leaf having a lightness close to the first mapped source cusp color in the same hue leaf, and other values of m define the mapping of the other colors in between.

As can be seen above, the second lightness mapping is also defined in case of a target color gamut that is not included within the source color gamut, for example when $C_C^{TARGET} > C_C^{SOURCE}$. In such a case, gamut mapping often expands the colors from the smaller source color gamut to the larger target color gamut. The invented second lightness mapping is defined such that the second mapped source colors are more numerous in the target color gamut or located closer to boundary of this target gamut. In this case, a larger part of the target color gamut is populated by the second mapped source colors than by the first mapped source colors. A better population of the target color gamut by the second mapped source colors has several advantages. A first advantage is that the target color gamut is better exploited. For example, if the target color gamut corresponds to the color gamut of a target display device, the second mapped source colors are more saturated and/or more contrast when shown on the target display device. A second advantage is that reduced change of chroma may be applied in the third step. In case of a target color gamut a target color gamut not being included within the source color gamut, the chroma mapping in the third step usually expands the chroma in order to still more improve the distribution of second mapped source colors within the target color gamut. A reduced chroma change in the third step is advantageous when preservation of source colors is requested.

Note that the above second lightness-mapping can be obtained by applying partly—for instance halfway—the first lightness mapping in inverse lightness direction. It means that, still using the lightness-mapping function definition module, a second lightness mapping function $f_{2.2}(C,L)$ is defined according to: $f_{2.2}(C,L) = q \times f_1(C,L)$, with q is negative number in the interval $]-1, 0[$. In the example shown in FIG. 8, the second lightness mapping performs back half way (i.e. q=−0.5) the first mapped source cusp color E' into the direction of the source cusp color E resulting into the second mapped source cusp color E". Similarly, color F', which located outside the target color gamut is second lightness-mapped into another color F''' having the same chroma and still located outside the target color gamut but closer to the boundary of this target color gamut. The advantage of this variant is that a large part of colors with smaller lightness than E' get closer to the target color gamut.

In order to be adaptive to different source and target color gamuts, this variant of second lightness-mapping operates by applying the first lightness mapping in inverse direction. But instead of mapping source colors, first mapped source colors are mapped. Instead of using the cusp line of the source color gamut, the first mapped cusp line is used. Instead of using the cusp line of the target color gamut, an intermediate cusp line is used that is interpolated from the source and target cusp lines.

Advantageously, the main example above of second lightness mapping can be concatenated with its variant resulting into a single second lightness mapping function $f_2(C,L)$.

The second lightness mapping function $f_2(C,L)$ is then applied to the first mapped colors resulting into second mapped colors N":

$$N'' = \begin{pmatrix} L'' = f_2(C, L') \\ a'' = a' \\ b'' = b' \end{pmatrix}.$$

3$^{rd}$ Optional Step: Chroma Mapping

This step is performed by the mapping module.

Second lightness-mapped colors N"—or first lightness-mapped colors N4 when there are located inside the target color gamut and then non-second lightness-mapped—are finally mapped into target colors N''' in a way that these target colors are inside the target color gamut. Preferably, during this third step, lightness is unchanged.

Preferably, this chroma mapping is performed in direction to a so-called anchor point along a mapping trajectory. In the specific embodiment of the invention, a color $$N_0 = \begin{pmatrix} L_0 = L'' \\ a_0 = 0 \\ b_0 = 0 \end{pmatrix}$$

positioned on the grey line is used as an anchor point. Straight lines are chosen as trajectories. It means that the mapping trajectories are parallel to the Chroma axis, then this mapping is actually a chroma mapping without change of lightness. This chroma-mapping can be described as a modification of distance K" between the second mapped color N" and the anchor point $N_0$ into a distance K''' between the target color N''' and the anchor point $N_0$, said distance K''' being calculated such that target colors are inside the target color gamut. Known algorithms can be used for this third mapping step, such as gamut compression, gamut clipping or gamut expansion. The above description of this chroma mapping corresponds to a definition of a third chroma mapping function which can be defined too by the lightness-mapping function definition module.

Thanks to the second step, the change of chroma resulting from this third step is reduced, because this second step has already increased the number of colors included in the target color gamut (for first lightness-mapped colors of the first class above) and/or has already brought first lightness-mapped colors closer to the boundaries of the target color gamut (for first lightness-mapped colors of the second class above).

After the first, second and third step above, target colors are obtained that are all in the target color gamut. Colors of the content can then be displayed on a target display having the target gamut as color gamut.

The color gamut mapping method according to the invention is notably applicable to professional color processing software, when the colorist needs to be free to choose any chroma variations, instead of depending of an automatic cusp mapping as in US2007/236761. Thanks to the invention, as at least the first two steps of the color gamut mapping is limited to variations of the lightness with chroma conservation, the colorist is totally free to choose any chroma variations in the last step of color processing. A high semantic level of artistic intents is then offered to the colorist, notably because a separate control for lightness and saturation is provided.

While the present invention is described with respect to a particular embodiment, it is understood that the present invention is not limited to this embodiment. The present invention as claimed therefore includes variations from this embodiment described herein, as will be apparent to one of skill in the art.

It is to be further understood that, because some of the constituent. system components and methods depicted in the accompanying drawings are preferably implemented in software, the actual connections between the system components or the process function blocks may differ depending upon the manner in which the invention is implemented.

The invention claimed is:

1. Method of color gamut mapping source colors into targets colors from a source color gamut towards a target color gamut in a gamut mapping color space that can be partitioned into 2D constant-hue leaves having axes for lightness and chroma, said method comprising:

first lightness-mapping each source color having a lightness L into a first lightness-mapped color having a lightness L' according to a first lightness-mapping function $f_1(C,L)$ associated with the constant-hue leaf comprising said source color, wherein said lightness-mapping function is defined such that a source cusp color defined as a color having a highest color chroma $C_C^{SOURCE}$ in said constant-hue leaf and in said source color gamut is lightness-mapped according to said function into a target cusp color defined as a color having a highest color chroma $C_C^{TARGET}$ in said constant-hue leaf and in said target color gamut, and, when said first lightness-mapped color is located out of said target color gamut:

second lightness-mapping said first lightness-mapped color into a second lightness-mapped color such that this second lightness-mapped color is located inside said target color gamut or outside said target color gamut but closer to the boundary of said target color gamut than before said second lightness-mapping, and such that any two different first mapped colors that are second lightness-mapped are second lightness-mapped into different second lightness-mapped colors.

2. Method of color gamut mapping according to claim 1 wherein said second lightness mapping is defined such that it maps lightness in opposite lightness direction of said first lightness mapping.

3. Method of color gamut mapping according to claim 1 comprising third mapping said second lightness-mapped color or said first lightness-mapped color when it is not second lightness-mapped into a final target color, wherein said first and second lightness-mapping keep unchanged hue and chroma, wherein said third mapping is defined such that said target color is within said target color gamut and keeps unchanged hue and lightness.

4. Method of color gamut mapping according to claim 2 wherein said second lightness-mapping is defined by a second lightness mapping function that correspond to said first lightness mapping function multiplied by a negative number in the interval]−1, 0[.

5. Method of color gamut mapping according to claim 1 wherein said first lightness-mapping function depends on a parameter t representative of the difference between the lightness L of the source color to map and the lightness of the black point of the source color gamut, or between the lightness L of the source color to map and the lightness of the white point of the source color gamut.

6. Method of color gamut mapping according to claim 1 wherein said first lightness mapping function depends on a parameter u representative of the ratio between the chroma C of the source color to map and the chroma of said source cusp color of the leaf of said constant hue h.

7. Color processing device for mapping source colors of a content into targets colors from a source color gamut towards a target color gamut, comprising at least one processor configured to:

define, for source colors located in a same leaf of constant-hue h, a first lightness-mapping function $f_1(C,L)$ adapted to lightness-map any of these source colors such that a source cusp color defined as a color having a highest color chroma in said constant-hue leaf and in said source color gamut is lightness-mapped according to said function into a target cusp color defined as a color having a highest color chroma in said constant-hue leaf and in said target color gamut, wherein said at least one processor is further configured to define, for colors located in a same leaf of constant-hue h, a second lightness-mapping function $f_2(C',L')$ adapted to lightness-map these colors inside said target color gamut or outside said target color gamut but closer to the boundary of said target color gamut than before said second lightness-mapping, and such that any two different first mapped colors that are second lightness-mapped are second lightness-mapped into different second lightness-mapped colors, apply said first lightness-mapping function $f_1(C,L)$ then said second lightness-mapping function $f_2(C',L')$ to said source colors located in said leaf of constant-hue h such as to output second lightness-mapped colors.

8. Color processing device according to claim 7, wherein said second lightness-mapping function $f_2(C',L')$ is further adapted to map colors in opposite lightness direction of said first lightness mapping.

9. Color processing device according to claim 7, wherein said at least one processor is further configured to define a third chroma-mapping function keeping unchanged hue and lightness, and wherein at least one processor is further configured to apply said third lightness-mapping function to colors obtained by the application of said second lightness-mapping function.

10. Color processing device according to claim 7, wherein said at least one processor is further configured to obtain, from said source color gamut, a source cusp line and, from said target color gamut, a target cusp line, and to define said source cusp color as the intersection of said constant-hue leaf with said source cusp line; and to define said target cusp color as the intersection of said constant-hue leaf with said target cusp line.

11. A non-transitory processor readable medium having stored therein instructions for causing a processor to perform the method of color gamut mapping according to claim 1.

* * * * *